Aug. 9, 1932.    E. S. STAPLES    1,870,757
AIRPLANE GIG
Filed June 22, 1931    2 Sheets-Sheet 1
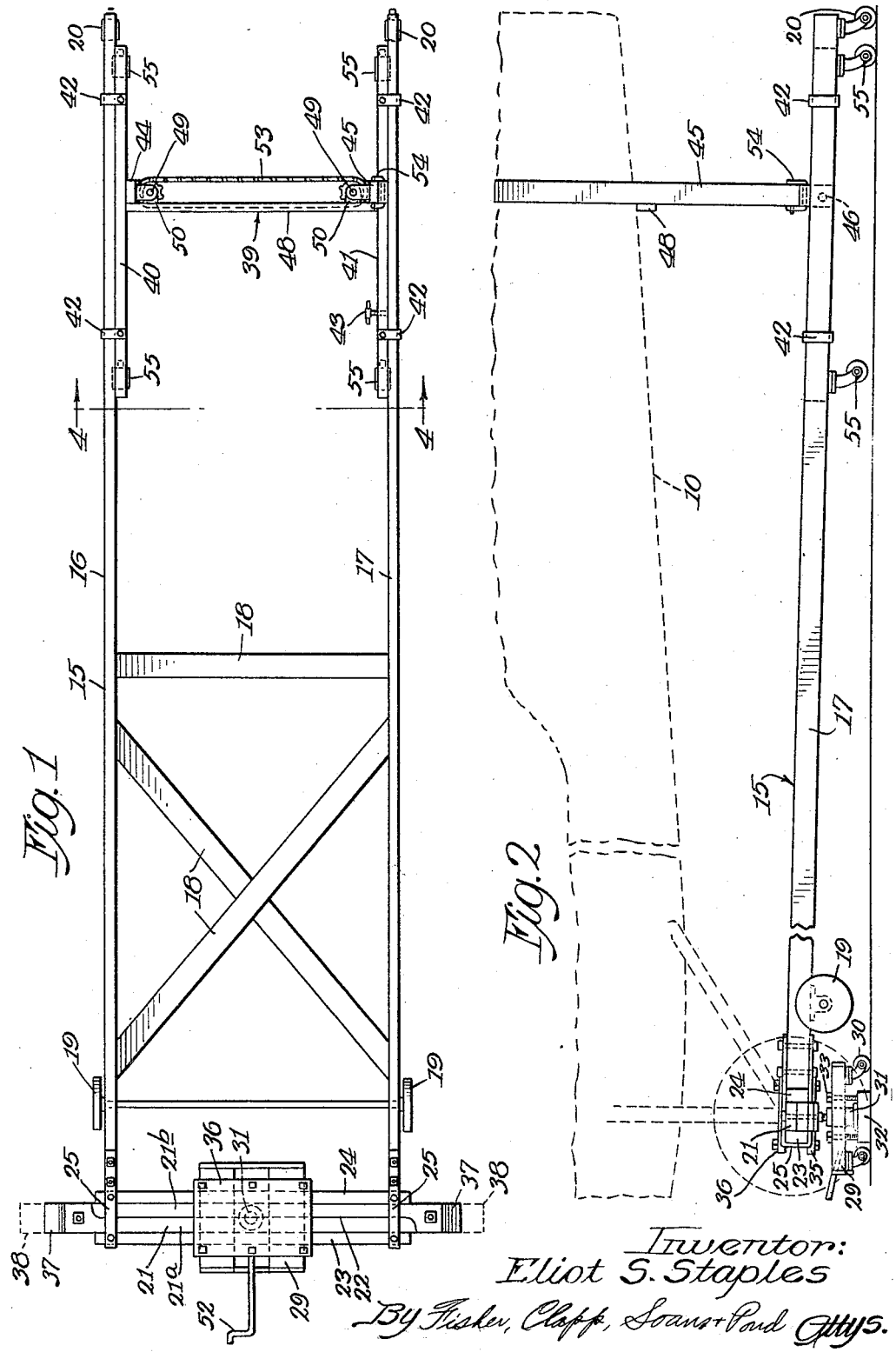
Inventor:
Eliot S. Staples
By Fisher, Clapp, Soans+Pond Attys.

Aug. 9, 1932.  E. S. STAPLES  1,870,757
AIRPLANE GIG
Filed June 22, 1931   2 Sheets-Sheet 2
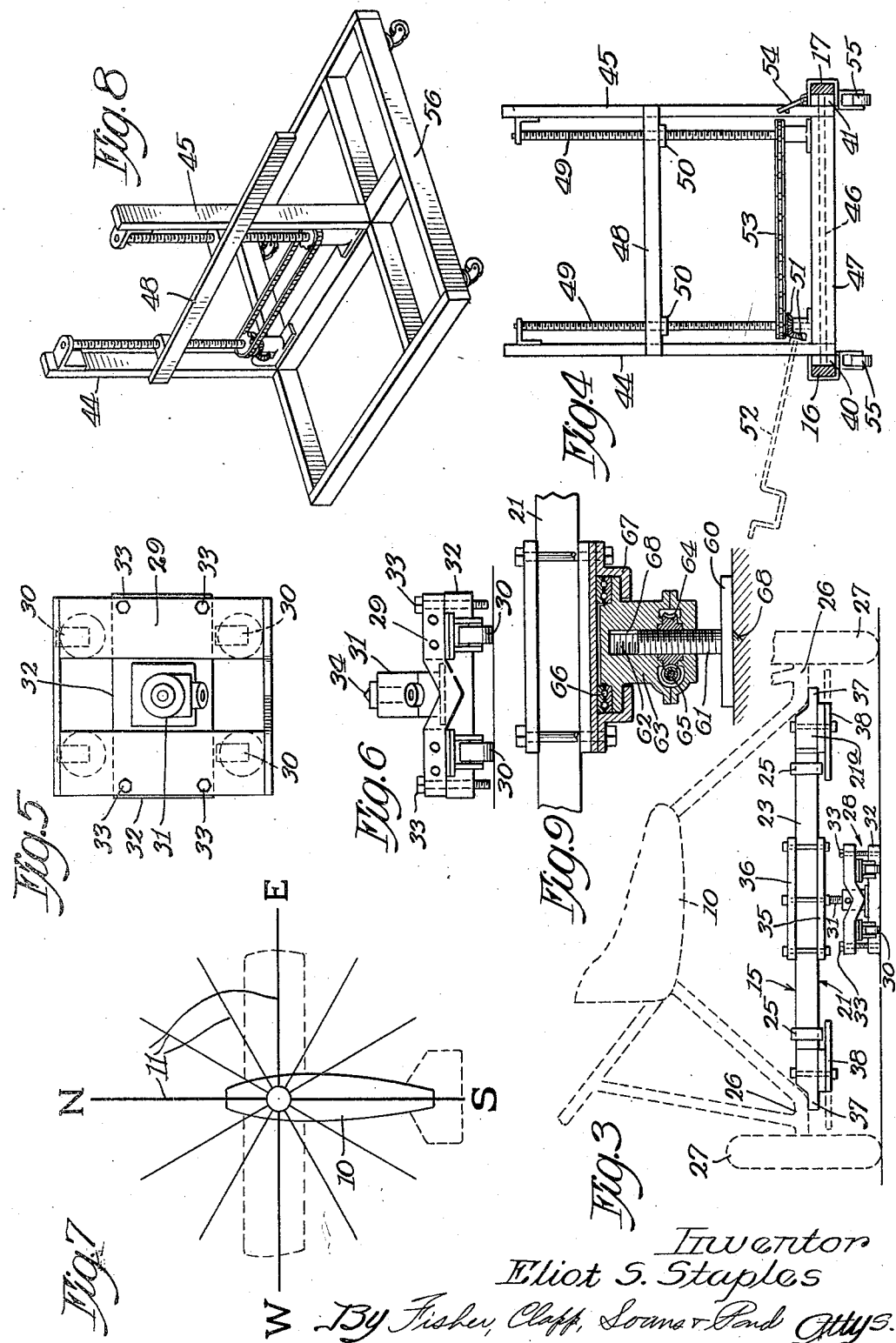
Inventor
Eliot S. Staples
By Fisher, Claff, Soans & Pond Attys.

Patented Aug. 9, 1932

1,870,757

UNITED STATES PATENT OFFICE

ELIOT S. STAPLES, OF GLENVIEW, ILLINOIS

AIRPLANE GIG

Application filed June 22, 1931. Serial No. 545,960.

This invention relates to an airplane gig, that is to say, a device for facilitating the handling of an airplane, special reference being had to facilitating the swinging of an airplane about a fixed center for the purpose of checking and adjusting the magnetic compass of the airplane, it being understood that airplanes are almost invariably equipped with such compasses.

The main objects of the invention are to provide means for simplifying and making easier the operations ordinarily performed in checking and adjusting the magnetic compass of an airplane; to provide a device which may be operatively associated with an airplane with great facility, usually under the manipulation of only one person; to provide such a device which is adapted to support an airplane approximately in normal flying position while also permitting swinging of the airplane about a predetermined fixed vertical axis with a minimum of effort; and, in general, it is the object of the invention to provide an improved device of the class described.

Other objects and advantages of the invention will be understood by reference to the following specifications and accompanying drawings (2 sheets) in which I have illustrated an airplane gig embodying a selected form of the invention and its manner of use together with certain modifications of certain parts of the device.

In the drawings:

Fig. 1 is a plan;

Fig. 2 is a side elevation;

Fig. 3 is an elevation of the front end of the device;

Fig. 4 is a section on the line 4—4 of Fig. 1;

Figs. 5 and 6 illustrate a combination dolly and jack structure constituting part of the device, Fig. 5 being a plan and Fig. 6 a front elevation thereof;

Fig. 7 is a diagram illustrating the manner in which the compass of an airplane is checked for accuracy;

Fig. 8 illustrates a modified form of a jack construction constituting part of the device; and Fig. 9 is a section illustrating a modified form of another jack construction forming another part of the device.

It is well known amongst aviators and others having a knowledge of magnetic compasses, that such compasses sometimes become inaccurate by reason of metallic bodies and magnetic fields present in the airplane or other structure with which the compass is associated and that such compasses sometimes become inaccurate because of loosening of the compass mounting as well as because of numerous other reasons. Compasses mounted on an airplane may be checked by spotting or centering the airplane over the center or axis of a fixed direction indicator such as indicated diagrammatically in Fig. 7. Such a direction indicator may conveniently be painted or otherwise permanently affixed to a concrete platform or base in such a manner that the direction indicating lines are clearly visible and of permanent accuracy.

In Fig. 7, the body or fuselage of an airplane is represented at 10 and the permanent, accurate direction indicator is designated 11.

Figure 11. In checking the compass of an airplane, the airplane is spotted over the center of the fixed direction indicator 11 and the fuselage 10 is aligned with any of the lines of the direction indicator. The compass of an airplane may then be checked and adjusted so that errors which occur on the various magnetic headings will be reduced to a minimum. Assuming, for example, that the first step in the process of checking the compass of an airplane is made with reference to the north and south direction line, as indicated in Figure 7, the next step for further checking a compass may be taken in connection with any of the other direction lines, for instance, the east and west line. The airplane is then swung about axis or center of the direction indicator 11 until the fuselage of the airplane is aligned with the east and west line, whereupon the compass may again be checked and adjusted if necessary. Such checking and adjusting operations may be repeated with as many direction lines as desired to assure a satisfactorily adjusted and accurate compass. It will be observed that this process involves the swinging of the airplane about a fixed axis which corresponds with the center of a permanent and accurate direction indicator.

It has hitherto been the practice to swing the airplane as required with the assistance of two or three mechanics or workmen whose combined strength would be sufficient to lift the weight of the rear portion of the airplane and to swing it in the manner desired. Such practice is not only expensive because of the necessary labor involved, but also unsatisfactory because of the difficulty of accurately spotting the airplane.

For overcoming the objections above noted to the more or less customary practice, I have devised an arrangement which includes a frame 15, which is designed to be inserted under an airplane from the front thereof and between its landing wheels as indicated in Figs. 2 and 3. The frame 15 is provided with means at its front end for supporting the front portion of the airplane in fixed relation to the center of the direction indicator 11 and the rear portion of the frame is provided with means for elevating the rear or tail portion of the airplane so as to support said tail portion approximately in normal flying position with respect to the front portion. The rear portion of the frame is also provided with rollers or casters which facilitate swinging of the airplane about the fixed front pivot.

As shown in Figure 1, the frame 15 includes side members 16 and 17 which are permanently connected and maintained in substantially spaced relations by cross members 18. Adjacent to its front end, the frame is provided with wheels 19, and at its rear end, it is provided with casters 20. The front end of the frame 15 is also provided with a longitudinally adjustable cross member 21, which is formed, for example, of a member which is divided as indicated at 22, so as to permit lengthening of the cross member when desired. As shown, the cross member is adjusted to its shortest length. The cross member 21, which thus comprises two main parts designated 21$^a$ and 21$^b$, is secured to the side members 16 and 17 of the frame through the agency of front and rear guides 23 and 24 and bracket members 25. The members 21$^a$ and 21$^b$ are thus slidably mounted between the front and rear guide members 23 and 24 and between the upward lower portions of the brackets 25, as will be readily understood from an inspection of Figure 2.

The frame 15 is adapted to be slid or rolled into position under an airplane, the wheels 19 and casters 20 facilitating insertion of the frame in this manner and the front cross member 21 is adapted to be positioned with its opposite end in vertical alignment with the axles 26 of the landing wheels 27 of the airplane substantially as shown in Fig. 3.

For elevating the front end of the frame 15, a combination dolly and jack designated 28 is provided. The latter device includes a carrier dolly 29 which is portably supported by means of casters 30. The dolly 29 is so constructed as to provide an opening therein and a jack 31 is located in said opening, substantially as shown in Fig. 5.

The jack 31 is mounted on a base member 32 and the base member is vertically adjustably connected to the dolly 29 by means of adjusting screws or equivalent means designated 33. When the frame 15 is in operative position with its front cross member 21 aligned with the axles 26, the jack carrying dolly is rolled into position as shown in Figs. 2 and 3, so that the upper end 34 of the jack, which is preferably pointed, is aligned with a predetermined center point in the cross member 21. When the jack is thus properly aligned, the adjusting screws 33 are turned so as to lower the base 32 until it rests on the ground whereupon the jack 31 is adjusted to cause the jack point 34 to engage the front cross member of the frame and to elevate such front member into engagement with the wheel axles 26. Further elevation of the jack 31 serves to lift the weight of the airplane off its landing wheels 27 so that substantially all of the weight of the airplane or at least a material portion thereof is supported by the jack 31 instead of by the wheels 27.

As clearly shown in the drawings, the jack 31 does not directly engage the cross member 21 but it does engage a plate 35 which constitutes one of the bars of the housing plates which are clamped together with front and rear guide members 23 and 24 interposed therebetween. The other housing plate is designated 36. It will be seen that the housing plates 35 and 36 together with the front rear guide members 23 and 24 form a housing in which the front cross member units 21$a$ and 21$b$ are slidably adjustable.

The opposite ends of the respective cross member units 21$a$ and 21$b$ are preferably provided with recessed seats such as indicated at 37. In some instances, the axles of the airplane are found to be so low that the recessed seats 37 cannot be inserted thereunder. To provide for such an emergency, I have provided pivotally mounted supporting bars 38 at each end of the cross bar, each bar 38 being pivoted to the cross bar so that it may be swung or turned from inoperative position beneath the cross bar as shown in full lines in Fig. 3 to extended or operative position as shown in broken lines in said Fig. 3.

When the weight of an airplane is removed from its wheels and transferred to the jack 31, it will be seen that the jack pivot point 34 constitutes a fixed pivot about which the airplane is adapted to be swung, tipping or tilting of the airplane being prevented by comparatively light engagements of the landing wheels 27 with the ground on opposite sides of the said pivot point.

The tail portion of the airplane is normally supported high enough by the usual tail skid to permit the rear portion of the frame 15 to be inserted under said tail portion. For elevating the tail portion of the airplane to a higher plane, preferably to approximately normal flying position relative to the position of the front or nose part of the airplane, I have provided a jack arrangement designated 39.

The jack arrangement 39 includes side base members 40 and 41 which are longitudinally slidably connected to the main frame side members 16 and 17 respectively. Any suitable sliding connection may be utilized and in this instance, I have illustrated such a connection effected by means of U-shaped brackets 42 which embrace the respective side members 16 and 17 and have their ends secured to the base members 40 and 41. A set screw 43 carried by one of the base members is designed to lock the jack in adjusted position relative to the main frame.

A pair of side members 44 and 45 are pivotally connected to the respective base side members 40 and 41 by means of a pivot rod 46, a spacer 47 being disposed around said pivot rod and between said side members 44 and 45 to maintain the latter in spaced relation. A cross bar 48 is vertically adjustably mounted on the side members 44 and 45 by suitable means, which in this instance includes screws 49 which are rotatably mounted at their ends on the respective side members 44 and 45, and nuts 50 which are carried by cross member 48 and which fit the screws 49. Any suitable means may be provided for effecting simultaneous rotation of the screws 49 so as to effect vertical adjustment of the cross bar 48. In this instance, such means is illustrated as including the bevel gear arrangement 51 adapted to be operated by a hand crank 52, and a chain 53 connecting the two screws through the agency of suitable sprockets carried by the respective screws.

The side members 44 and 45 and the parts carried thereby are pivotally mounted on the base members 40 and 41 by means of the pivot rod 46 so that the said parts may be swung down so as to occupy the space between the base members 40 and 41 when the main frame 15 is being inserted under the airplane. When the frame 15 is in its proper position under the airplane, the jack arrangement 39 is swung to upright position in which it may be locked by any suitable means, for instance, a U-shaped clip 54 which is carried by the base member 41 and arranged to embrace the side member 45 when in upwardly extending position. When the rear elevating jack 39 is in upwardly extending position, rotation is imparted to the screws 49 so as to elevate the cross bar 48 which is thereby caused to engage the bottom of the tail part of the fuselage of the airplane to raise same to the desired elevation. The jack construction 39 may be provided with casters, such as indicated at 55, for taking up the weight of the rear portion of the mechanism when being transported from one place to another, thereby to eliminate strains on the sliding connection between the base members 40 and 41 and the respective side frame members 16 and 17.

It will be seen that by means of the device thus described, an airplane may be supported in a normal flying position, and that when the airplane is so positioned and the weight thereof is supported at its front end by pivot point of the front jack 31 and at its rear end by the casters 20, it is a comparatively simple and easy matter for one person to swing the airplane about the front fixed pivot to any desired position. Also it will be noticed that the entire device is such that it may be manipulated by one person unassisted so that such unassisted person may carry on the entire operation of checking and adjusting the compass of an airplane without other assistance.

I have found that the jack arrangement 39, used in connection with the rear portion of my airplane gig, forms a desirable device for supporting the tail portion of the airplane while in storage and also for supporting other portions of an airplane for other temporary or more or less permanent purposes. While the jack structure described in connection with the frame 15 may be used in the form I have described, I prefer, for use as an independent device, to modify the same to provide the arrangement indicated in Fig. 8.

By inspection of Figure 8, it will be seen that the cross bar 48 is extended beyond the upright 45; i. e., the cross bar projects laterally outwardly from the upright 45, and the base of the arrangement is correspondingly extended as indicated at 56 to underlie the lateral extension of the cross bar. Also, the side members 44 and 45 may be rigidly secured to the base instead of being pivotally mounted thereon.

The front jack construction previously described may be modified so as to permanently connect the elevating mechanism to the frame 15, one such arrangement being illustrated in Figure 9. As will be evident from an inspection of Figure 9, the modified arrangement includes a base plate 60 having a screw post 61 projecting upwardly therefrom and slidably fitting an opening 62 in a housing 63. The housing 63 is provided with means for rotatably but axially fixedly supporting a nut 64 adjacent to the lower end of the housing 63, and with means for rotatably supporting a worm 65 in operative engagement with a worm wheel formed on the periphery of the nut 64. The housing 63 rotatably supports the front cross member 21 by suitable means, for instance, ball bearings 66, and the said housing member 63 is anchored to the front member 21 by means of a flanged collar 67. A key 68 cooperating between the screws 61 and housing 63 may be provided for preventing relative rotation between the screw and housing. Rotary movement imparted to the worm 65 will obviously effect vertical adjustment between the screw 61 and housing 63, such vertical adjustment being transmitted to the front member 21 of the frame 15 through the ball bearings 66 which provide for free pivotal movement of the frame 15 and parts supported thereby about the axis of the bearing 66 which is preferably concentric with the axis of the screw 61. Suitable means, for instance, a depending centering point 68, may be provided on the screw base 60 for facilitating accurate centering of this modified jack construction in the center of the direction indicator shown in Fig. 7. The intersection of the direction lines 11 may be formed with a socket adapted to receive the centering point whereby accuracy in positioning is assured.

I am aware that other changes in the various details of construction may be made without departing from the spirit of my invention, the scope of which should be determined by reference to the following claims, same being construed as broadly as possible consistent with the state of the art.

I claim as my invention:

1. Apparatus of the class described, comprising means for supporting the front portion of an airplane for horizontal, pivotal movement about a fixed center, and vertically adjustable means connected with said front-supporting means for portably supporting the rear portion of the airplane.

2. Apparatus of the class described, comprising means for supporting the front portion of an airplane for horizontal, pivotal movement about a fixed center, and vertical adjustable means horizontally adjustably connected with said front-supporting means for portably supporting the rear portion of the airplane.

3. Apparatus of the class described, comprising means adapted to engage the axles of the landing wheels of an airplane for supporting the front portion of the airplane independently of its landing wheels, said supporting means being operative to support the airplane for horizontal, pivotal movement about a fixed center, and means connected with said front-supporting means for portably supporting the rear portion of the airplane.

4. Apparatus of the class described, comprising a longitudinally adjustable beam adapted to engage the axles of the landing wheels of an airplane, for supporting the front portion thereof independently of its landing wheels, said supporting means being operative to support the airplane for horizontal, pivotal movement about a fixed center, and means horizontally adjustably connected with said front-supporting means for portably supporting the rear portion of an airplane.

5. In a device in the class described, the combination of an elongated frame, means at one end of said frame for engaging a portion of an airplane, means associated with said end of the frame for elevating said end relative to the ground so as to remove the weight of the airplane from its landing wheels, said elevating means being operatively connected to said frame so as to pivotally support the same, and means carried by the frame adjacent to its other end for horizontally portably supporting another portion of the airplane.

6. In a device in the class described, the combination of an elongated frame, means at one end of said frame for engaging a portion of an airplane, means associated with said end of the frame for elevating said end relative to the ground so as to remove the weight of the airplane from its landing wheels, said elevating means being operatively connected to said frame so as to pivotally support the same, and vertically adjustable means carried by the frame adjacent to its other end for horizontally portably supporting another portion of the airplane.

7. In a device in the class described, the combination of an elongated frame, means at one end of said frame for engaging a portion of an airplane, means associated with said end of the frame for elevating said end relative to the ground so as to remove the weight of the airplane from its landing wheels, said elevating means being operatively connected to said frame so as to pivotally support the same, and means horizontally adjustably mounted on said frame adjacent to its other end for supporting the rear portion of the airplane, and means for portably supporting said rear-supporting means.

8. In a device of the class described, the combination of an elongated frame having a height and width permitting the frame to be inserted under the body of an airplane and its landing gear and between the landing wheels thereof, means adjacent one end of said frame for engaging a portion of the airplane, means associated with said end of the frame for elevating said end relative to the ground so as to remove the weight of the airplane from its landing wheels, said elevating means being operatively connected to said frame so as to pivotally support the same, and means associated with the rear end portion of the frame for horizontally portably supporting the rear end portion of the airplane.

9. In a device of the class described, the combination of an elongated frame having a height and width permitting the frame to be inserted from the front of the airplane to a position under the fuselage of the airplane and its landing gear, and between the landing wheels thereof, means adjacent one end of said frame for engaging a portion of the airplane, means associated with said end of the frame for elevating said end relative to the ground so as to remove the weight of the airplane from its landing wheels, said elevating means being operatively connected to said frame so as to pivotally support the same, and means foldably mounted on the frame adjacent to its rear portion for supporting the rearward portion of the airplane in elevated position, said foldably mounted means being adapted to be folded relative to the frame to permit said insertion of the frame under the airplane, and said means being adapted to be unfolded to upwardly extended position for supporting said rear portion of the airplane in said elevated position.

10. In a device of the class described, the combination of an elongated frame having a height and width permitting the frame to be inserted under the body of an airplane and its landing gear, and between the landing wheels thereof, means adjacent one end of said frame for engaging a portion of the airplane, means associated with said end of the frame for elevating said end relative to the ground so as to remove the weight of the airplane from its landing wheels, said elevating means being operatively connected to said frame so as to pivotally support the same, and means horizontally, adjustably and foldably mounted on the frame adjacent to its rear end for supporting the rearward portion of the airplane in elevated position, said horizontally, adjustably and foldably mounted means being adapted to be folded relative to the frame to permit insertion of the frame under the airplane from the front thereof, and said means being adapted to be unfolded to upwardly extending position for supporting said rear portion of the airplane in said elevated position.

11. In a device of the class described, the combination of an elongated frame having a height and width permitting the frame to be inserted under the body of an airplane and its landing gear and between the landing wheels thereof, means adjacent one end of said frame for engaging a portion of the airplane, means associated with said end of the frame for elevating said end relative to the ground so as to remove the weight of the airplane from its landing wheels, said elevating means being operatively connected to said frame so as to pivotally support the same, and vertically adjustable means horizontally, adjustably and foldably mounted on the frame adjacent its rear portion for supporting the rearward portion of the airplane in elevated position, said rear-supporting means being adapted to be folded relative to the frame to permit insertion of the frame under the airplane from the front thereof, and said means being adapted to be unfolded to upwardly extending position for supporting said rear portion of the airplane in said elevated position.

12. A jack adapted to engage the tail portion of the fuselage of an airplane for elevating the same, comprising a portable base, a pair of relatively horizontally spaced members extending upwardly from said base in normally fixed relation thereto, a cross bar extending across the space between said upright members, and means for vertically adjustably mounting said cross bar on said upright members.

13. A jack for elevating the rear portion of an airplane, comprising a portable but stable base, a pair of relatively horizontally spaced members extending upwardly from said base, means for foldably mounting said upwardly extending members on said base, a cross bar extending across the space between said upright members, and means for mounting said cross bar on said upright members for simultaneous vertical adjustment relative thereto.

14. In a jack for elevating a portion of the airplane, the combination of a portable base, a pair of relatively spaced members extending upwardly from said base in relatively fixed position, a cross bar extending across the space between said upwardly extending members and vertically adjustably connected therewith, said cross bar having an end portion extending laterally outwardly from one of said upwardly extending members.

ELIOT S. STAPLES.